United States Patent [19]

Doré et al.

[11] Patent Number: 4,499,018

[45] Date of Patent: Feb. 12, 1985

[54] POLYPHTHALOCYANINE COMPOUNDS USEFUL AS DYESTUFFS

[75] Inventors: Jacky Doré, Basel; Helmut Moser, Oberwil, both of Switzerland

[73] Assignee: Sandoz Ltd., Basel, Switzerland

[21] Appl. No.: 434,470

[22] Filed: Oct. 15, 1982

Related U.S. Application Data

[63] Continuation-in-part of Ser. No. 394,400, Jul. 2, 1982, abandoned.

[30] Foreign Application Priority Data

Jul. 4, 1981 [DE] Fed. Rep. of Germany ....... 3126458
Jan. 9, 1982 [DE] Fed. Rep. of Germany ....... 3200455

[51] Int. Cl.³ .................. C09B 47/30; C09B 47/32
[52] U.S. Cl. ................................ 260/245.81; 8/189; 260/242.2; 260/245.1; 260/245.73; 260/245.76; 260/245.78
[58] Field of Search ............ 260/242.2, 245.1, 245.73, 260/245.76, 245.78, 245.81; 8/189

[56] References Cited

U.S. PATENT DOCUMENTS

| | | | |
|---|---|---|---|
| 2,513,098 | 6/1950 | Kropa et al. | 260/245.73 |
| 3,320,275 | 5/1967 | Dien et al. | 260/245.81 |
| 3,784,599 | 1/1974 | Jefferies et al. | 260/242 |
| 4,394,125 | 7/1983 | Hölzle et al. | 260/245.78 X |

FOREIGN PATENT DOCUMENTS 1082967 9/1967 United Kingdom .

*Primary Examiner*—Richard L. Raymond
*Attorney, Agent, or Firm*—Gerald D. Sharkin; Richard E. Vila; Thomas C. Doyle

[57] ABSTRACT

A phthalocyanine product in which at least two phthalocyanine groups which may be metallized or unmetallized are joined by a bridging group, the bridging group being attached to the phthalocyanine groups through —$CH_2$—$X_o$— linkages where $X_o$ is a basic group and the phthalocyanine groups are attached to the methylene group of the linkages. The phthalocyanine product is useful as a dyestuff.

18 Claims, No Drawings

POLYPHTHALOCYANINE COMPOUNDS USEFUL AS DYESTUFFS

This application is a continuation-in-part of application Ser. No. 394,400, filed July 2, 1982, abandoned.

The invention relates to phthalocyanine products for use as dyestuffs.

According to the invention there is provided a phthalocyanine product in which at least two phthalocyanine groups which may be metallised or unmetallised are joined by a bridging group, the bridging group being attached to the phthalocyanine groups through $-CH_2-X_o-$ linkages where $X_o$ is a basic group and the phthalocyanine groups are attached to the methylene group of the linkages.

Preferably the phthalocyanine groups are metallised and preferred metals are copper, cobalt, iron, zinc, aluminium and nickel.

Further according to the invention there is provided a product of formula I

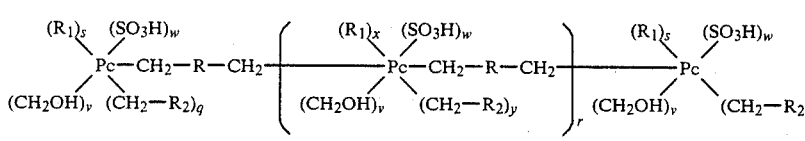

in which

Pc is a metallised or unmetallised phthalocyanine group,

R is a group of one of the formulae a to d

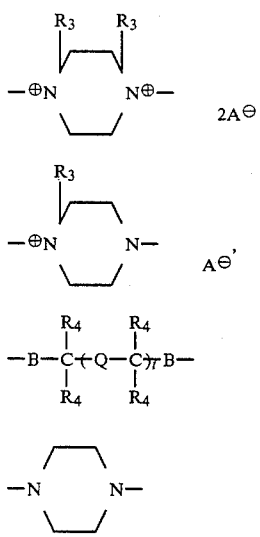

where each B independently is

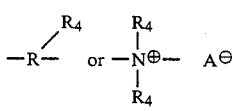

$R_1$ is a group of the formula

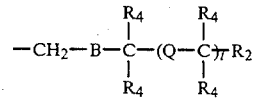

where $R_3$ is $C_{1-10}$alkyl, unsubstituted or substituted by one group selected from CN, OH, unsubstituted phenyl and halogen; or $C_{2-10}$alkenyl, unsubstituted or substituted by one group selected from CN, OH, unsubstituted phenyl and halogen;

$R_4$ is hydrogen, $C_{1-10}$alkyl unsubstituted or substituted by one group selected from CN, OH, unsubstituted phenyl and halogen; or $C_{2-10}$alkenyl unsubstituted or substituted by one group selected from CN, OH, unsubstituted phenyl and halogen;

Q is a direct bond or a bridging group;

$R_2$ is

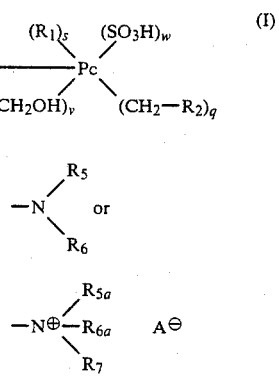

where either $R_5$ and $R_6$ independently are selected from hydrogen; $C_{1-10}$alkyl unsubstituted or substituted by one substituent selected from CN, OH, unsubstituted phenyl, halogen, $-CONH_2$ and $-COO(C_{1-4}alkyl)$; $C_{2-10}$alkenyl unsubstituted or substituted by one substituent selected from CN, OH, unsubstituted phenyl, halogen, $-CONH_2$ and $COO(C_{1-4}alkyl)$; $C_{6-8}$cycloalkyl, unsubstituted or substituted by up to three $C_{1-4}$alkyl or $C_{1-4}$alkoxy groups, which alkyl or alkoxy groups may be substituted by up to three substituents selected from OH, CN and halogen; and $C_{6-10}$aryl substituted by up to two $C_{1-4}$alkyl or $C_{1-4}$alkoxy groups which alkyl or alkoxy groups may be substituted by one substituent selected from OH, CN and halogen; or $R_5$ and $R_6$ together with the N-atom to which they are attached form a morpholine, piperidine, pyrrolidine or piperazine group each of which may be substituted by up to three $C_{1-4}$alkyl groups, which alkyl groups may be substituted by one OH, CN or halogen groups;

and either $R_{5a}$, $R_{6a}$ independently have the non-heterocyclic significances of $R_5$ and $R_6$ except for hydrogen.

and $R_7$ is $C_{1-10}$alkyl, unsubstituted or substituted by up to three substituents selected from CN, OH, unsubstituted phenyl and halogen; or $C_{2-10}$alkenyl, unsubstituted or substituted by one substituent selected from CN, OH, unsubstituted phenyl and halogen;

or $R_{5a}$, $R_{6a}$ and $R_7$ together with the $N^\oplus$ atom to which they are attached form a pyridinium ring which may be substituted by up to two C$_{1-4}$alkyl groups, which alkyl groups may be substituted by one OH, CN or halogen, or a group of formula

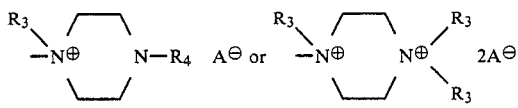

A$^{\ominus}$ is a non-chromophoric anion;
r is number from 0 to 20;
s is a number from 0 to 6; x is a number from 0 to 6;
t is 0 or 1;
q is a number from 0 to 6; y is a number from 0 to 6;
v is a number from 0 to 1;
w is a number from 0 to 0.5.
with the provisos that (i) s+q+v on each terminal phthalocyanine moiety is 1 to 6, preferably 1.5 to 6, more preferably 2 to 6; and (ii) s+q=x+y+1 where one of s and q is at least 1.

In this specification unless indicated to the contrary where any symbol appears in a formula more than once, the significances are independent of each other. However, the significances of the symbols s, q, v and w and x and y (when appearing more than once) which appear in a particular formula are the same for each phthalocyanine moiety with which they are associated in a formula. Further where a range is stated as from one number to another number it includes the numbers defining the range, for example the range 0 to 6 includes 0 and 6.

For the avoidance of doubt, unless indicated to the contrary, where a proviso relates to symbols representing the number of groups appearing associated with a phthalocyanine moiety, the proviso refers to the symbols per phthalocyanine moiety. That is to say where s+q+v is 1 to 6 this refers to the significances on *each* terminal phthalocyanine moiety.

The letters s,q,v,w,x,y (defined above) and p (defined below) are average values when not whole numbers.

Still further the invention provides a mixture comprising a product of formula I as described above and a product of formula II

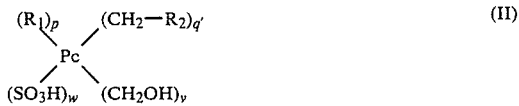

in which R$_1$, Pc, R$_2$, v, and w are above defined, p is a number from 0 to 7; and q' is a number from 0 to 7; with the provisos that (1) p and q are not both zero and
(2) p+q+v is no greater than 7.

Preferably Pc is Pc' where Pc' is copper-, nickel-, iron-, cobalt-, zinc- or aluminium-phthalocyanine.

Preferably R is R' where R' is a group of the formula

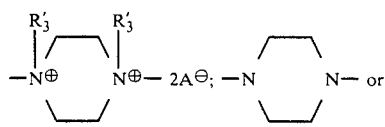

-continued

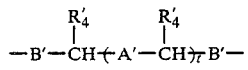

where t is already defined and R$_3'$, R$_4'$, B' and Q' are hereinafter defined.

R$_1$ is preferably R$_1'$ where R$_1'$ is

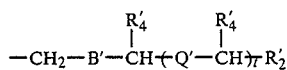

Preferably R$_2$ is R$_2'$ where each R$_2'$ independently is

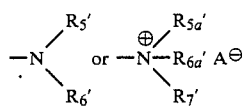

where R$_5'$, R$_{5a}'$, R$_6'$, R$_{6a}'$ and R$_7'$ are hereinafter defined.

Preferably R$_3$ is R$_3'$ where R$_3'$ is (C$_{1-4}$)alkyl unsubstituted or substituted by one CN, OH or halogen group. More preferably R$_3$ is methyl.

Preferably R$_4$ is R$_4'$ where R$_4'$ is hydrogen or C$_{1-4}$alkyl unsubstituted or substituted by one CN, OH or halogen group. More preferably R$_4$ is R$_4''$ where R$_4''$ is methyl or hydrogen.

Preferably R$_5$ and R$_6$ are R$_5'$ and R$_6'$ where R$_5'$ is selected from hydrogen; unsubstituted C$_{1-4}$alkyl; C$_{1-4}$alkyl substituted by one —COO(C$_{1-4}$)alkyl, unsubstituted phenyl or —CONH$_2$ group; C$_{2-4}$—alkyl substituted by one chloro, bromo, CN or OH group; cyclohexyl unsubstituted or substituted by one unsubstituted (C$_{1-4}$)alkyl or unsubstituted (C$_{1-4}$)alkoxy group; and phenyl, unsubstituted or substituted by one (C$_{1-4}$)alkyl or one (C$_{1-4}$)alkoxy group, where the alkyl or alkoxy group may be substituted by one substituent selected from halogen, OH and CN; and R$_6'$ is selected from hydrogen, unsubstituted C$_{1-4}$alkyl, unsubstituted cyclohexyl, (C$_{2-4}$)alkyl substituted by one chloro, bromo, OH or CN group and unsubstituted phenyl;

or R$_5'$ and R$_6'$ together with the N-atom to which they are attached form an unsubstituted morpholine, an unsubstituted piperidine, an unsubstituted pyrrolidine, an N-methyl piperazine or an unsubstituted piperazine and R$_{5a}'$ and R$_{6a}'$ independently, have the non-heterocyclic significances of R$_5'$ and R$_6'$ except for hydrogen; and R$_7'$ is unsubstituted C$_{1-4}$alkyl; or R$_{5a}'$, R$_{6a}'$ and R$_7'$ together with the N$^{\oplus}$ atom to which they are attached form a pyridinium ring, unsubstituted or substituted by a methyl group,

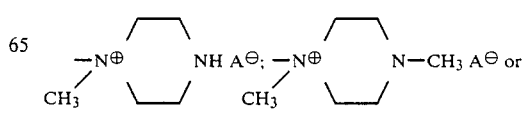

-continued

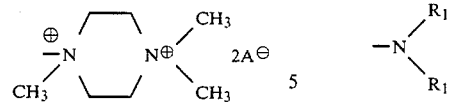

More preferably $R_5$, $R_{5a}$, $R_6$, $R_{6a}$ and $R_7$ are methyl.

Preferably A is Q′ where Q′ is selected from a direct bond; —O—; —S—;

a branched or straight chain $(C_{1-10})$alkylene group which may be interrupted by one —O—, —S— or

group; or which may be substituted by one CN, OH or halogen group; or a group of the formula

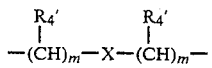

where
m is 0, 1, 2, 3, 4, 5 or 6;
$R_9$ is hydrogen, $C_{1-4}$alkyl unsubstituted or substituted by one OH, CN or halogen group; naphthyl unsubstituted or substituted by one $C_{1-4}$alkyl group or phenyl, unsubstituted or substituted by one $C_{1-4}$alkyl group, the alkyl of which may be substituted by one OH, CN or halogen group,
X is —NH—CO—NH; —NH—CO—(CH$_2$-)$_m$—CO—NH—;

each $R_{11}$ independently, is hydrogen, unsubstituted $C_{1-4}$alkyl or unsubstituted phenyl.

Preferably B is B′ where B′ is

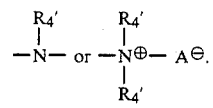

More preferably B is B″ where B″ is —NH—; —N(CH$_3$)— or

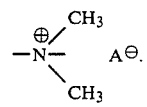

More preferably B″ is

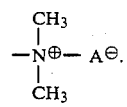

Preferably p is p′ where p′ is a number no greater than 4.

Preferably r is r′ where r′ is a number from 0 to 6.
More preferably r is r″ where r″ is a number from 0 to 4. Most preferably r=0.
Preferably s is s′ where s′ is a number no greater than 3.
Preferably x is x′ where x′ is s or s−1.
Preferred products of formula I are of formula Ia

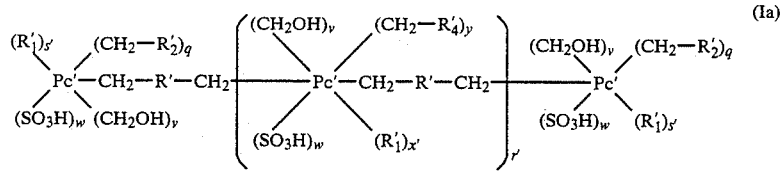

with the provisos that (i) s′+q+v is a number from 1 to 3 and (ii) s′+q=x′+y+1.

More preferred products of formula I are of formula Ib

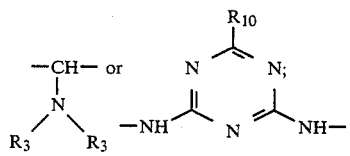

$R_{10}$ is OH, Cl or

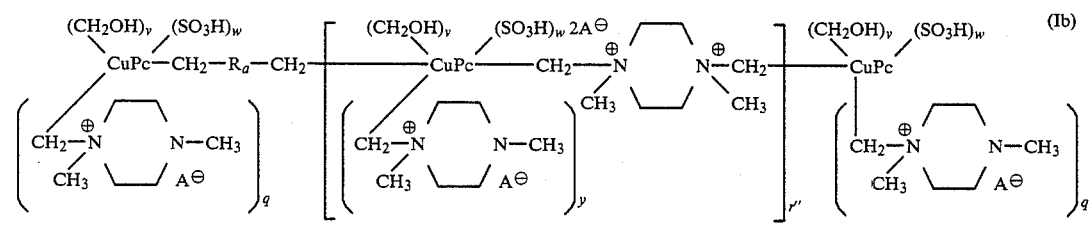

where $R_a$ is

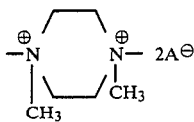

with the provisos that
(i) y+1=q and
(ii) q+v is a number from 1 to 3.

Alternatively more preferred products of the formula I are of formula Ic

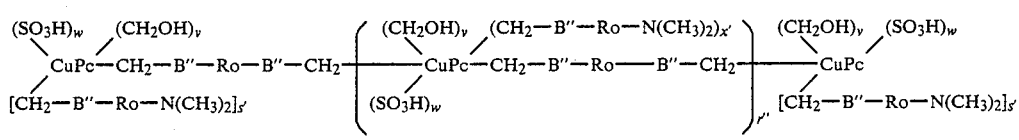

in which Ro is —(CH$_2$)$_3$—, —(CH$_2$)$_4$—, —(CH$_2$)$_5$—, —(CH$_2$)$_6$—,

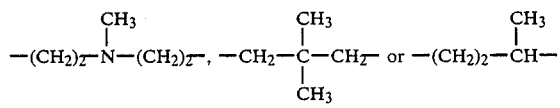

with the provisos that
(i) s'+v is a number from 1 to 3;
(ii) x'=s'−1.

Preferred products of formula II in mixtures according to the invention are of formula IIa

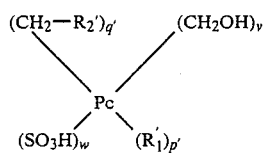

where all the symbols are defined above with the proviso that p'+q'+v is a number from 2 to 4.

More preferred products of formula II in mixtures according to the invention are of formula IIb

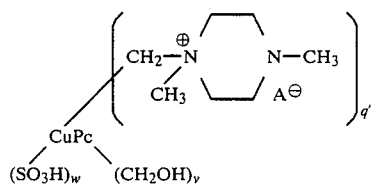

where all the symbols are defined above and where q'+v is a number from 2 to 4.

Alternatively more preferred products of formula II in mixtures of the invention are of formula IIc

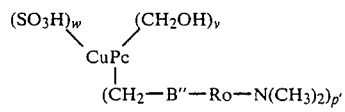

where all the symbols are above defined and where p'+v is a number from 2 to 4.

Preferably each phthalocyanine is substituted by identical substituents.

Products and mixtures according to the invention can be prepared by reacting a halomethylphthalocyanine with a compound having two primary, secondary or tertiary amino end groups.

Products of formula I and mixtures comprising products of formula I and of formula II may be prepared by reacting one mol of a compound of formula X $$Pc—(CH_2—hal)_a \quad\quad X$$

where hal is halogen and a is a number from 1 to 7 with at least a/2 moles of a diamine or a mixture of compounds of formula XI or XII

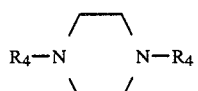

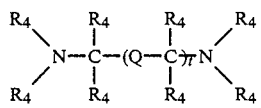

followed, where necessary, by quaternising the product.

Where —CH$_2$—R$_2$ is present in the product of the invention the product produced immediately above (by reacting the compound of formula X with that of formula XI or XII [optionally followed by quaternation]) is treated with a compound of formula XIII or XIV

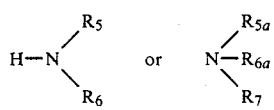

respectively, followed where necessary (for example when R$_5$ or R$_6$ is hydrogen) by alkylation or alkenylation, for example quaternization. All symbols are as above defined.

The reaction of halomethylphthalocyanine, for example a compound of formula X, with a compound having two primary secondary or tertiary amino end groups, for example a compound of formula XI or XII, is usually carried out in an aqueous medium, if necessary in the presence of an organic solvent, for example dimethylformamide at temperatures of 30° to 100°, preferably 40° to 95° C. and at a pH of 7 to 12, preferably 8.5 to 11 in the presence of a base, for example alkali hydroxide (calcium or sodium hydroxide).

A further reaction of this product with an amine of formula XIII or XIV can be carried out by conventional methods.

Quaternation, alkylation or alkenylation can be carried out by known methods.

The resulting products of the invention, usually in the form of mixtures, can be isolated from the alkaline aqueous suspension produced by known methods.

In the products of formula I and II the anion may be exchanged for example by using an ion exchanger or by reaction with salt or acid, where necessary in more than one step for example using hydroxide or bicarbonate or according to the methods of German Offenlegungsschrift 2,001,748 and 2,001,816.

Examples of anions $A^\ominus$, which may be organic or inorganic are halogen, chloride, bromide, sulphate, bisulphate, methylsulphate, aminosulphate, perchlorate, benzenesulphonate, oxalate, maleate, acetate, propionate, lactate, succinate, tartrate, malate, methanesulphonate or benzoate or a complex ion such as $ZnCl_4^{2\ominus}$ or the anions of the following acids: boric acid, citric acid, glycollic acid, diglycollic acid adipic acid or the addition product of ortho boric acid with polyalcohol for example cis-polyol.

The products of formula I and II ionize in an aqueous solution of pH about 7. The products of the invention can be used in aqueous solution or dispersion, for example in the form of a concentrated stable solution in quaternised form or as the salt form of organic or mineral acids or in part as internal salts, for dyeing all types of cellulose fibres, cotton fibres or leather, particularly paper or paper products. Dyeing is carried out by known methods.

The dyestuffs can be added in the mass to produce dyed sized or unsized paper. Dyeing may also be carried out by dipping.

The products of the invention produce backwaters with little or no colour after dyeing. This is advantageous when the backwater is recycled and avoids expensive cleaning procedures.

The products of the invention (and their preparations) have a high substantivity, do not run when dyed on paper and are not very pH specific.

Paper dyeings made with the products of the invention have good light fastness properties. By a longer exposure to light the nuance changes tone in tone. Paper dyeings made with the dyes of the invention have good wet fastness properties not only for water but for milk, soapy water, sodium chloride solution, fruit juice and sweetened mineral water. The dyeings on paper also have good alcohol fastnesses and have a good nuance stability.

The products of the invention may also be used to dye, print or pad polyamide or polyester textiles having modified anionic groups.

In the following Examples all percentages and parts are by weight and all temperatures are in °C. unless indicated to the contrary.

EXAMPLE 1

A dyestuff mixture of products of the formulae (1) and (2)

$$\left[ (R_a)_2-CuPc-CH_2-\overset{\underset{\displaystyle CH_3}{\displaystyle CH_3}}{\overset{\oplus}{N}}-(CH_2)_3-\overset{\underset{\displaystyle CH_3}{\displaystyle CH_3}}{\overset{\oplus}{N}}-CH_2-CuPc-(R_a)_2 \right]^{2} Cl^\ominus \quad (1)$$

and $$(R_a)_3-CuPc \quad (2)$$

where each $R_a$ is $$-CH_2-\overset{\underset{\displaystyle CH_3}{\displaystyle CH_3}}{\overset{\oplus}{N}}-(CH_2)_3-N(CH_3)_2 \; Cl^\ominus$$

is formulated as follows:

(a) 18 Parts (1/40 mol) of tris(chloromethyl) copper phthalocyanine (formed by known methods) is warmed to 70°-75° with 50 parts of water and 3.3 parts of N, N, N', N' tetramethyl-1,3-diaminopropane.

A blue suspension forms and is stirred for 1 hour at 70° and the pH is held at 8.5–9 by the addition of weak aqueous sodium hydroxide solution.

(b) A further 6.6 parts (1/20 mol) of the above diamine is added to the solution of (a) and the mixture is stirred for a further 3 hours at 70°. The mixture of dyestuffs 1 and 2 is precipitated from the aqueous reaction mixture by acetone.

(c) 10 Parts of the dyestuff mixture produced in (b) above in aqueous solution is reacted with dimethylsulphate at a pH of 7 to 8 and at 20°-30° according to known methods. The quaternary trimethylammonium products of compounds of formulae (1) and (2) above are formed.

EXAMPLE 2

If in part (b) of Example 1 instead of using the diamine of Example 1b, 4 parts (1/20 mol) of pyridine is added to the reaction mixture instead, a dyestuff mixture of products of the following formulae (3) and (4) is produced:

$$\left[ \begin{array}{c} CuPc-CH_2-\overset{\underset{\displaystyle CH_3}{\displaystyle CH_3}}{\overset{\oplus}{N}}-(CH_2)_3-\overset{\underset{\displaystyle CH_3}{\displaystyle CH_3}}{\overset{\oplus}{N}}-CH_2-CuPc \\ (R_b)_2 \qquad\qquad\qquad\qquad\qquad (R_b)_2 \end{array} \right] .2Cl^\ominus \quad (3)$$

and $$\left[ \begin{array}{c} CuPc-R_a \\ | \\ (R_b)_2 \end{array} \right] \quad (4)$$

in which $R_a$ is defined in Example 1 and each $R_b$ is $$-CH_2-\overset{\oplus}{N}\diagup\!\!\!\bigcirc \quad Cl^\ominus.$$

The dyestuffs dye paper a turquoise shade with good fastness properties.

In the above Example 2 the pyridine groups may be replaced by trimethylamine groups, triethylamine groups, dimethyl β-hydroxyethylamine, picoline, morpholine or dimethylamine to produce similar good dyestuff mixtures.

In the following Examples the significances of $R_2$ are as below:

$Z_1$ is 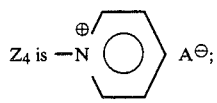

$Z_2$ is 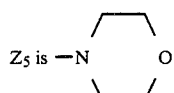

$Z_3$ is 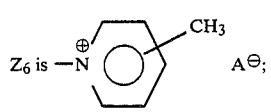

$Z_4$ is 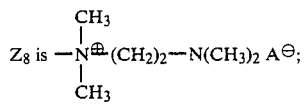

$Z_5$ is 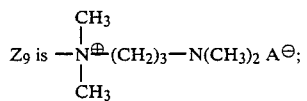

$Z_6$ is 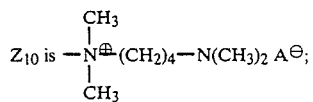

$Z_7$ is $-N(CH_3)_2$ $Z_8$ is 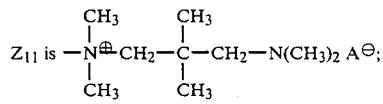

$Z_9$ is 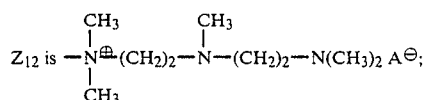

$Z_{10}$ is 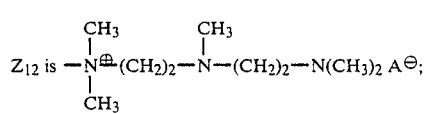

$Z_{11}$ is 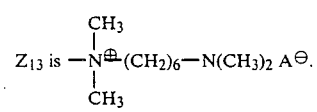

$$Z_{12} \text{ is } -\overset{CH_3}{\underset{CH_3}{N^{\oplus}}}-(CH_2)_2-\overset{CH_3}{N}-(CH_2)_2-N(CH_3)_2\ A^{\ominus};$$

and $$Z_{13} \text{ is } -\overset{CH_3}{\underset{CH_3}{N^{\oplus}}}-(CH_2)_6-N(CH_3)_2\ A^{\ominus}.$$

EXAMPLES 3 TO 18

In the following Examples 3 to 22 (of Table C) mixtures of compounds 2 to 21 of formula 5 and compounds 22 to 32 of formula 6 below are made according to the procedure of Example 1 from suitable starting materials.

(a) Compounds 2 to 21

These compounds are of the formula 5 below where the lettered symbols are defined in Table A.

TABLE A

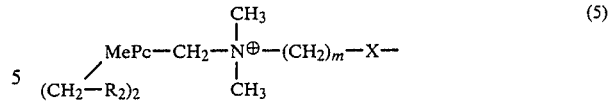

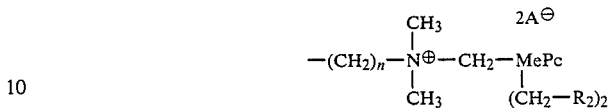

| Cpd. No. | Me | m | n | X | $R_2$ |
|---|---|---|---|---|---|
| 2 | Cu | 2 | 0 | direct bond | $z_8$ |
| 3 | Co | 2 | 0 | " | $z_8$ |
| 4 | Al | 2 | 0 | " | $z_8$ |
| 5 | Cu | 3 | 0 | " | $z_9$ |
| 6 | Co | 3 | 0 | " | $z_9$ |
| 7 | Al | 3 | 0 | " | $z_9$ |
| 8 | Cu | 2 | 2 | " | $z_{10}$ |
| 9 | Cu | 1 | 1 | $-C(CH_3)_2-$ | $z_{11}$ |
| 10 | Cu | 2 | 2 | $-N(CH_3)-$ | $z_{12}$ |
| 11 | Cu | 3 | 3 | direct bond | $z_{13}$ |
| 12 | Cu | 2 | 0 | " | $z_1$ |
| 13 | Co | 2 | 0 | " | $z_2$ |
| 14 | Al | 2 | 0 | " | $z_3$ |
| 15 | Ni | 2 | 0 | " | $z_4$ |
| 16 | Cu | 2 | 0 | " | $z_5$ |
| 17 | Cu | 2 | 0 | " | $z_6$ |
| 18 | Cu | 2 | 0 | " | $z_7$ |
| 19 | Cu | 3 | 3 | " | $z_1$ |
| 20 | Cu | 1 | 1 | $-C(CH_3)_2-$ | $z_3$ |
| 21 | Cu | 2 | 2 | $-N(CH_3)-$ | $z_3$ |

(b) Compounds 22 to 32

These compounds are of the formula (6) below in which the lettered symbols are described in Table B.

TABLE B

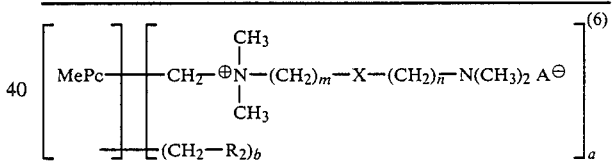

| Cpd. No. | Me | m | n | X | $R_2$ | a | b |
|---|---|---|---|---|---|---|---|
| 22 | Cu | 2 | 0 | direct bond | $z_1$ | 2 | 1 |
| 23 | Co | 2 | 0 | " | $z_2$ | 2 | 1 |
| 24 | Al | 2 | 0 | " | $z_3$ | 2 | 1 |
| 25 | Cu | 3 | 0 | " | $z_4$ | 1,9 | 1,1 |
| 26 | Cu | 3 | 0 | " | $z_5$ | 2,1 | 0,9 |
| 27 | Co | 3 | 0 | " | $z_6$ | 2 | 1 |
| 28 | Al | 3 | 0 | " | $z_7$ | 2 | 1 |
| 29 | Cu | 1 | 1 | $-C(CH_3)_2-$ | $z_1$ | 2 | 1 |
| 30 | Cu | 2 | 2 | $-N(CH_3)-$ | $z_1$ | 2 | 1 |
| 31 | Cu | 2 | 0 | direct bond | — | 2,5 | 0 |
| 32 | Ni | 2 | 0 | " | $z_3$ | 2 | 1 |

TABLE C

| Example No. | Mixture of Compound of formula 5 | Compound of formula 6 |
|---|---|---|
| 3 | Compound 2 | Compound 22 |
| 4 | Compound 3 | Compound 23 |
| 5 | Compound 4 | Compound 25 |
| 6 | Compound 5 | Compound 26 |
| 7 | Compound 6 | Compound 27 |
| 8 | Compound 7 | Compound 28 |
| 9 | Compound 8 | Compound 22 |
| 10 | Compound 9 | Compound 29 |
| 11 | Compound 10 | Compound 30 |
| 12 | Compound 11 | Compound 25 |
| 13 | Compound 12 | Compound 31 | parts (2/40 mol) N-methylcyclohexylamine. The suspension is stirred for 1 hour at 60° at a pH of 11 after which 1.8 parts (1/80 mol) of N,N,N',N',-tetramethyl-1,3-diaminobutane is added and the temperature is raised to 93°–95° at the same time holding the pH at 11. After stirring for 20 hours at 93°–95° and pH 11 the dyestuff suspension is cooled to 60° and filtered. The resulting mixture is about 90% products of the formula (11)

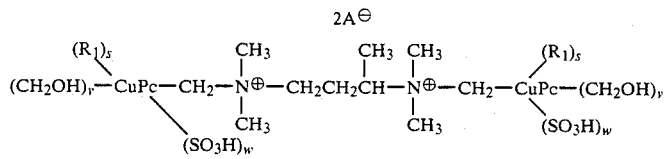

where each $R_1$ is

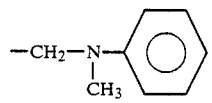

$s+v=2$ and
$w=0-0.5$
and about 10% of products of formula (12)

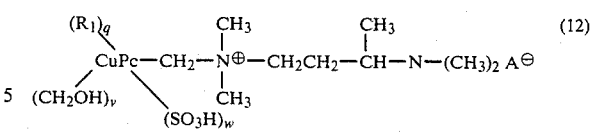

where $R_1$ is defined above
$q+v=2$ and
$w=0-0.5$.

The mixture dyes paper in mineral or organic acid medium a turquoise tone with good fastnesses.

EXAMPLES 25a TO 60

In the following Table, Table D a mixture of products of the formula (13)

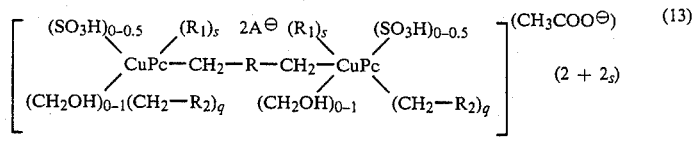

where $R_1$ is

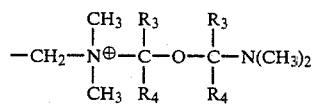

and products of formula (14)

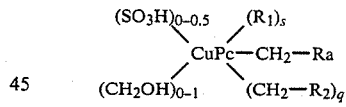

may be made according to the method of Example 23 using appropriate starting materials.

TABLE D

| Example No. | R | s | R₃ | R₄ | Q | q | R₂ | Rₐ |
|---|---|---|---|---|---|---|---|---|
| 25a | $\overset{\oplus}{N}(CH_3)_2-(CH_2)_2-\overset{\|}{N}(CH_3)\overset{\|}{-}CH_3$ | 2 | H | H | direct bond | 0 | — | $-\overset{\oplus}{N}(CH_3)_2-(CH_2)_2-\overset{\|}{N}(CH_3)\overset{\|}{-}CH_3\ A^\ominus$ |
| 26 | " | 2 | H | H | $-CH_2-\overset{CH_3}{\underset{\|}{N}}-CH_2-$ | 0 | — | " |
| 27 | " | 0 | — | — | — | 2 | pyridinium $A^\ominus$ | " |
| 28 | $\overset{\oplus}{N}(CH_3)_2-(CH_2)_3-\overset{\|}{N}(CH_3)\overset{\|}{-}CH_3$ | 2 | H | H | direct bond | 0 | — | $-\overset{\oplus}{N}(CH_3)_2-(CH_2)_3-\overset{\|}{N}(CH_3)\overset{\|}{-}CH_3\ A^\ominus$ |
| 29 | " | 2 | H | H | $-CH_2-$ | 0 | — | " |
| 30 | " | 0 | — | — | — | 2 | N-methylpiperidinium $A^\ominus$ | " |
| 31 | " | 0 | — | — | — | 2 | N-methylpiperazinium $A^\ominus$ | " |
| 32 | $\overset{\oplus}{N}(CH_3)_2-(CH_2)_4-\overset{\|}{N}(CH_3)\overset{\|}{-}CH_3$ | 0 | — | — | — | 2 | $-\overset{\oplus}{N}(CH_3)_3\ A^\ominus$ | $-\overset{\oplus}{N}(CH_3)_2-(CH_2)_4-\overset{\|}{N}(CH_3)\overset{\|}{-}CH_3\ A^\ominus$ |
| 33 | " | 0 | — | — | — | 2 | $-\overset{\oplus}{N}(CH_3)_2 A^\ominus\ \|\ CH_2CH_2OH$ | $-\overset{\oplus}{N}(CH_3)_2-(CH_2)_4-\overset{\|}{N}(CH_3)\overset{\|}{-}CH_3\ A^\ominus$ |

TABLE D-continued

| Example No. | R | s | R₃ | R₄ | Q | q | R₂ | Rₐ |
|---|---|---|---|---|---|---|---|---|
| 44 | [1,4-dimethylpiperazinium] | 0 | — | — | — | 2 | [1,4-dimethylpiperazinium, N-CH₃ A⊖] | [1,4-dimethylpiperazinium, N-CH₃ A⊖] |
| 45 | " | 0 | — | — | — | 2 | [1-methylpiperazinium, NH A⊖] | |
| 46 | " | 0 | — | — | — | 2 | [N-methylpyridinium A⊖] | |
| 47 | " | 0 | — | — | — | 2 | —N(CH₃)₃⊕ | |
| 48 | " | 2 | H | H | —CH₂— | 0 | — | |
| 49 | " | 1 | H | H | —(CH₂)₂— | 1 | ⊕N(CH₃)₃ A⊖ | |
| 50 | " | 0 | — | — | — | 2 | [1,1,4,4-tetramethylpiperazinium, 2A⊖] | |
| 51 | [(CH₃)₃N⊕CH₂CH₂CH(CH₃)N⊕(CH₃)₂—] | 0 | — | — | — | 2 | [N-methylpyridinium A⊖] | [(CH₃)₃N⊕(CH₂)₂CH(CH₃)N⊕(CH₃)₂ A⊖, with additional CH₃—N—CH₃ group] |
| 52 | " | 2 | CH₃/H | H | —CH₂— | 0 | — | " |
| 53 | " | 0 | — | — | — | 2 | [cyclohexyl-N(CH₃)H] | " |

TABLE D-continued

| Example No. | R | s | $R_3$ | $R_4$ | Q | q | $R_2$ | $R_a$ |
|---|---|---|---|---|---|---|---|---|
| 54 | $-N^\oplus(CH_2)_6-N\begin{smallmatrix}CH_3\\|\\|\\CH_3\end{smallmatrix}$ with $CH_3$ groups | 2 | H | H | $-(CH_2)_4-$ | — | — | $-N^\oplus(CH_2)_6-N\begin{smallmatrix}CH_3\\|\\|\\CH_3\end{smallmatrix}A^\ominus$ |
| 55 | " | 0 | — | — | — | 2 | morpholino | " |
| 56 | $\begin{smallmatrix}CH_3\\|\\-N^\oplus-CH_2-C(CH_3)_2-N^\oplus\\|\\CH_3\end{smallmatrix}$ | 2 | H | H | $\begin{smallmatrix}CH_3\\|\\-C-\\|\\CH_3\end{smallmatrix}$ | — | — | $\begin{smallmatrix}CH_3\\|\\-N^\oplus-CH_2-C(CH_3)_2-N\\|\\CH_3\end{smallmatrix}A^\ominus$ |
| 57 | $-N^\oplus(CH_2)_5-CH(-(CH_2)_5)-N(CH_3)_2$ (complex) | 2 | H | H | $-(CH_2)_4-CH(N(CH_3)_2)-(CH_2)_4-$ | — | — | analogous complex $A^\ominus$ |
| 58 | $-N^\oplus(CH_2)_4-N\begin{smallmatrix}CH_3\\CH_3\end{smallmatrix}$ | 0 | H | H | H | 2 | $-CH_2-C_6H_5-N^\oplus(CH_3)_2 A^\ominus$ | $-N^\oplus(CH_2)_4-N\begin{smallmatrix}CH_3\\CH_3\end{smallmatrix}A^\ominus$ |
| 59 | " | 0 | H | H | H | 2 | $-N^\oplus(CH_3)_2-CH_2CH_2OH\ A^\ominus$ | " |
| 60 | " | 0 | H | H | H | 2 | $-N^\oplus(CH_3)_2-(CH_2)_3-N(morpholino)\ A^\ominus$ | " |

EXAMPLE 61

18 Parts (1/40 mol) of tri(chloromethyl) copper phthalocyanine (made by known methods) is mixed with 50 parts of water and 0.75 parts of 1,2-diaminoethane (1/80 mol). A homogeneous suspension is produced and then 2,95 parts of trimethylamine (1/30 mol) and 20 parts of an approximately 30% aqueous sodium hydroxide solution is added. The suspension is heated at 93°–95° for 2 hours and held at this temperature for 20 hours. After cooling to 60° the dye is filtered and washed with portions of water until the filtrate is practically neutral in colour.

The dyestuff mixture dissolves very well in mineral and organic acid mediums and dyes paper a turquoise tone, giving dyeings with good light and wet fastnesses.

The dyestuff mixture is a mixture of products of formula (15),

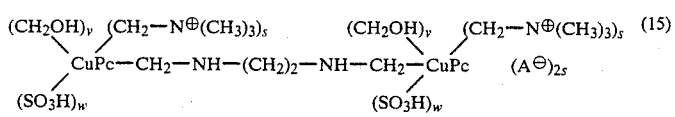

and products of formula (16)

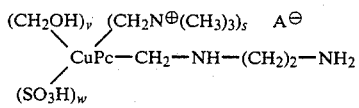

where
$S + v = 2$
$W = 0 - 0.5$.

EXAMPLE 62 TO 80

A dyestuff mixture of products of the formula (17)

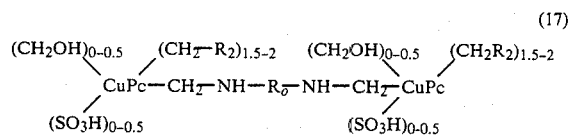

and products of formula (18)

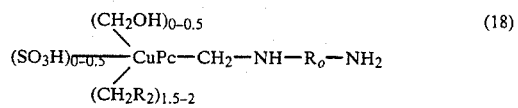

may be made according to the method of Example 61. The significances of $R_o$ and $R_2$ are given in Table E below.

TABLE E

| Example No. | $R_o$ | $R_2$ |
|---|---|---|
| 62 | $-(CH_2)_2-$ | $-N^{\oplus}(C_2H_5)_3$  $A^{\ominus}$ |
| 63 | $-(CH_2)_2-$ | $-\underset{CH_3}{\overset{CH_3}{N^{\oplus}}}-CH_2CH_2OH$  $A^{\ominus}$ |
| 64 | $-(CH_2)_2-$ | $-\underset{CH_3}{\overset{CH_3}{N^{\oplus}}}-C_6H_{11}$  $A^{\ominus}$ |
| 65 | $-(CH_2)_2-\underset{CH_3}{N}-(CH_2)_2-$ | $-N^{\oplus}(CH_3)_3$  $A^{\ominus}$ |
| 66 | $-(CH_2)_2-\underset{CH_3}{N}-(CH_2)_2-$ | $-\underset{CH_3}{\overset{CH_3}{N^{\oplus}}}-CH_2-C_6H_5$  $A^{\ominus}$ |
| 67 | $-(CH_2)_2NH(CH_2)_2-$ | $-N^{\oplus}(CH_3)_3$  $A^{\ominus}$ |
| 68 | $-(CH_2)_3NH-(CH_2)_3-$ | $-N^{\oplus}(CH_3)_3$  $A^{\ominus}$ |
| 69 | $-(CH_2)_3-NH(CH_2)_2-$ | $-N^{\oplus}(CH_3)_3$  $A^{\ominus}$ |
| 70 | $-(CH_2)_3-\underset{CH_3}{N}-(CH_2)_3-$ | $-N^{\oplus}(CH_3)_3$  $A^{\ominus}$ |
| 71 | $-CH_2-\underset{OH}{CH}-CH_2-$ | $-N^{\oplus}(CH_3)_3$  $A^{\ominus}$ |

TABLE E-continued

| Example No. | $R_o$ | $R_2$ |
|---|---|---|
| 72 | —CH—CH₂CH₂—<br>   \|<br>   CH₃ | $-\overset{\oplus}{N}(CH_3)_3 \quad A^{\ominus}$ |
| 73 | —CH—CH₂CH₂—<br>   \|<br>   CH₃ | $-\underset{CH_3}{\overset{CH_3}{\underset{\|}{\overset{\|}{N^\oplus}}}}-CH_2CH_2CH_2-N\begin{pmatrix}\diagup\\\diagdown\end{pmatrix}O \quad A^{\ominus}$ |
| 74 | —[(CH₂)₂—(NH—CH₂)₂—]₂NH— | $-\overset{\oplus}{N}(CH_3)_3 \quad A^{\ominus}$ |
| 75 | —(CH₂)₂— | $-\underset{CH_3}{\overset{CH_3}{\underset{\|}{\overset{\|}{N^\oplus}}}}-(CH_2)_3N(C_2H_5)_2 \quad A^{\ominus}$ |
| 76 | —(CH₂)₂— | $-\underset{CH_3}{\overset{CH_3}{\underset{\|}{\overset{\|}{N^\oplus}}}}-(CH_2)_4-N(CH_3)_2 \quad A^{\ominus}$ |
| 77 | —(CH₂)₂NH(CH₂)₂— | $-\underset{CH_3}{\overset{CH_3}{\underset{\|}{\overset{\|}{N^\oplus}}}}-(CH_2)_4-N(CH_3)_2 \quad A^{\ominus}$ |
| 78 | —(CH₂)₂NH(CH₂)₂— | $-\underset{CH_3}{\overset{CH_3}{\underset{\|}{\overset{\|}{N^\oplus}}}}-(CH_2)_3N(C_2H_5)_2 \quad A^{\ominus}$ |
| 79 | —(CH₂)₂NH(CH₂)₂— | $-\underset{CH_3}{\overset{CH_3}{\underset{\|}{\overset{\|}{N^\oplus}}}}-(CH_2)_3N(CH_3)_2 \quad A^{\ominus}$ |
| 80 | —(CH₂)₂NH(CH₂)₂— | $-\underset{CH_3}{\overset{CH_3}{\underset{\|}{\overset{\|}{N^\oplus}}}}-CH_2CH_2\underset{CH_3}{\overset{\|}{CH}}-N(CH_3)_2 \quad A^{\ominus}$ |
| 81 | —(CH₂)₂—NH—(CH₂)₃— | $-\underset{CH_3}{\overset{CH_3}{\underset{\|}{\overset{\|}{N^\oplus}}}}-CH_2CH_2OH \quad A^{\ominus}$ |

EXAMPLES 82 TO 85

A dyestuff of formula (19)

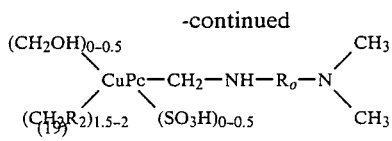
(19)

and products of formula (20) and (21)

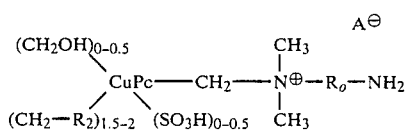
(20)

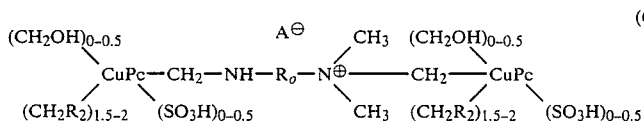
(21)

in which R and $R_2$ are given in Table F below can be formed from appropriate starting materials according to the method of Example 61.

TABLE F

| Example No. | $R_o$ | $R_2$ |
|---|---|---|
| 82 | —(CH$_2$)$_3$— | —N$^\oplus$(CH$_3$)(CH$_3$)—(CH$_2$)$_3$—N(CH$_3$)$_2$   A$^\ominus$ |
| 83 | —(CH$_2$)$_3$— | —N$^\oplus$(CH$_3$)(CH$_3$)—CH$_3$   A$^\ominus$ |
| 84 | —(CH$_2$)$_4$— | —N$^\oplus$(CH$_3$)(CH$_3$)—CH$_3$   A$^\ominus$ |
| 85 | —(CH$_2$)$_3$— | —N$^\oplus$(CH$_3$)(CH$_3$)—CH$_2$—C$_6$H$_5$   A$^\ominus$ |

DYEING EXAMPLE A

70 Parts of chemically bleached cellulose sulphite (from conifer wood) and 30 parts of chemically bleached cellulose sulphite (from birch wood) are ground in 2000 parts of water.

To this mixture 0.2 parts of the mixture of Example 1 is added. After mixing for 20 minutes a paper mass is formed. The absorbent paper so produced is turquoise in colour and the backwater is clear.

Instead of the mixture of Example 1 any of the mixtures of Examples 2 to 84 may be used.

DYEING EXAMPLE B 0.5 Parts of the dyestuff mixture of Example 1 can be dissolved in 100 parts of hot water and then cooled to room temperature. This solution is added to 100 parts of chemically bleached cellulose sulphite which has been ground in 2000 parts of water in a hollander. After 15 minutes sizing is carried out. Paper produced from this material is a turquoise colour of middle intensity with good wet fastness.

Instead of the mixture of Example 1 any of the mixtures of Examples 2 to 84 may be used.

DYEING EXAMPLE C

An absorbent paper web of unsized paper can be drawn at 40°–50° through a dyestuff solution of the following composition:

0.5% of the dyestuff mixture of Example 1, 0.5% of starch and 99.0% water. The excess dyestuff is removed by pressing between two rollers. The dried paper web is turquoise in colour with good fastnesses.

Instead of using a dyestuff mixture of Example 1 any of the mixture of Examples 2 to 84 may be used.

DYEING EXAMPLE D

2 Parts of the dyestuff mixture of Example 1 are dissolved in a dyeing bath having 4000 parts of hard water at 40° C. 100 Parts of a cotton web are introduced into the bath and the bath is heated over 30 minutes to boiling. The bath is held at boiling for 1 hour, topping up from time to time. The dyeing is then taken out of the liquor, washed with water and dried. The dyestuff take up approaches 100% leaving practically colourless liquor in the bath.

The dyeings produced are of a turquoise colour and have good light fastness and wet fastness properties.

Instead of the mixture of Example 1 any of the mixtures of Examples 2 to 84 may be used.

What we claim is:

1. A cationic phthalocyanine dyestuff in which at least two phthalocyanine groups, which may be metallized or unmetallized, are joined by a group —CH$_2$—R—CH$_2$— wherein R is a group of one of the formulae (a) to (d)

where each B independently is

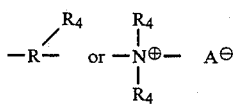

$R_3$ is C$_{1-10}$alkyl, unsubstituted or substituted by one group selected from CN, OH, unsubstituted phenyl and halogen; or C$_{2-10}$alkenyl, unsubstituted or substituted by one group selected from CN, OH, unsubstituted phenyl and halogen;

$R_4$ is hydrogen, C$_{1-10}$alkyl unsubstituted or substituted by one group selected from CN, OH, unsubstituted phenyl and halogen; or C$_{2-10}$alkenyl unsubstituted or substituted by one group selected from CN, OH, unsubstituted phenyl and halogen;

Q is a direct bond or a bridging group; and A$^\ominus$ is a non-chromophoric anion, the phthalocyanine groups being attached to the methylene moieties of the group —CH$_2$—R—CH$_2$—.

2. A cationic phthalocyanine dyestuff of the formula I

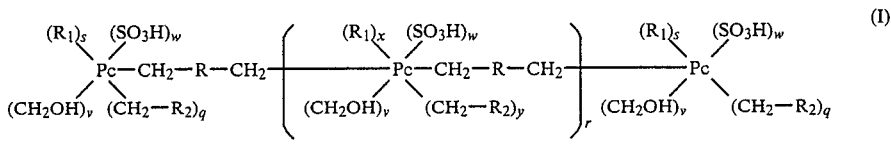

in which
Pc is a metallised or unmetallised phthalocyanine group,
R is a group of one of the formulae (a) to (d)

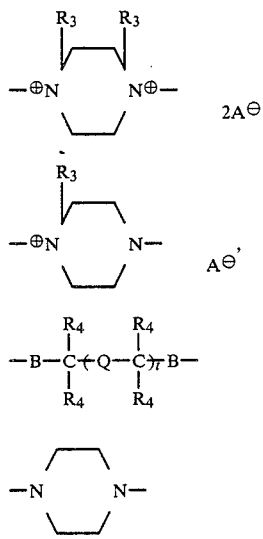

where
each B independently is

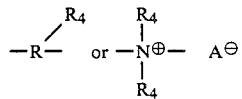

$R_1$ is a group of the formula

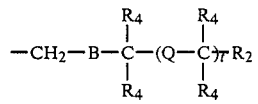

where
$R_3$ is $C_{1-10}$alkyl, unsubstituted or substituted by one group selected from CN, OH, unsubstituted phenyl and halogen; or $C_{2-10}$alkenyl, unsubstituted or substituted by one group selected from CN, OH, unsubstituted phenyl and halogen;
$R_4$ is hydrogen, $C_{1-10}$alkyl unsubstituted or substituted by one group selected from CN, OH, unsubstituted phenyl and halogen; or $C_{2-10}$alkenyl unsubstituted or substituted by one group selected from CN, OH, unsubstituted phenyl and halogen;
Q is a direct bond or a bridging group;
$R_2$ is

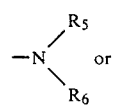

-continued

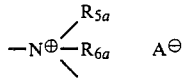

where
either $R_5$ and $R_6$ independently are selected from hydrogen; $C_{1-10}$alkyl unsubstituted or substituted by one substituent selected from CN, OH, unsubstituted phenyl, halogen, —CONH$_2$ and —COO($C_{1-4}$alkyl); $C_{2-10}$alkenyl unsubstituted or substituted by one substituent selected from CN, OH, unsubstituted phenyl, halogen, —CONH$_2$ and COO($C_{1-4}$alkyl); $C_{6-8}$cycloalkyl, unsubstituted or substituted by up to three $C_{1-4}$alkyl or $C_{1-4}$alkoxy groups, which alkyl or alkoxy groups may be substituted by up to three substituents selected from OH, CN and halogen; and $C_{6-10}$aryl substituted by up to two $C_{1-4}$alkyl or $C_{1-4}$alkoxy groups which alkyl or alkoxy groups may be substituted by one substituent selected from OH, CN and halogen; or
$R_5$ and $R_6$ together with the N-atom to which they are attached form a morpholine, piperidine, pyrrolidine or piperazine group each of which may be substituted by up to three $C_{1-4}$alkyl groups, which alkyl groups may be substituted by one OH, CN or halogen groups;
and either $R_{5a}$, $R_{6a}$ independently have the non-heterocyclic significances of $R_5$ and $R_6$ except for hydrogen,
and $R_7$ is $C_{1-10}$alkyl, unsubstituted or substituted by up to three substituents selected from CN, OH, unsubstituted phenyl and halogen; or $C_{2-10}$alkenyl, unsubstituted or substituted by one substituent selected from CN, OH, unsubstituted phenyl and halogen;
or $R_{5a}$, $R_{6a}$ and $R_7$ together with the N$^\oplus$ atom to which they are attached form a pyridinium ring which may be substituted by up to two $C_{1-4}$alkyl groups, which alkyl groups may be substituted by one OH, CN or halogen, or a group of formula

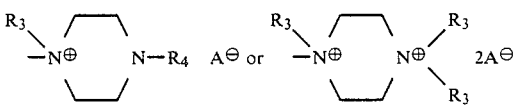

A$^\ominus$ is a non-chromophoric anion
r is a number from 0 to 20;
s is a number from 0 to 6; x is a number from 0 to 6;
t is 0 or 1;
q is a number from 0 to 6; y is a number from 0 to 6;
v is a number from 0 to 1;
w is a number from 0 to 0.5;
with the provisos that
(i) s+q+v on each terminal phthalocyanine moiety is 1 to 6 and (ii) s+q=y+1 where one of s and q is at least 1.

3. A phthalocyanine product according to claim 2 of formula Ia

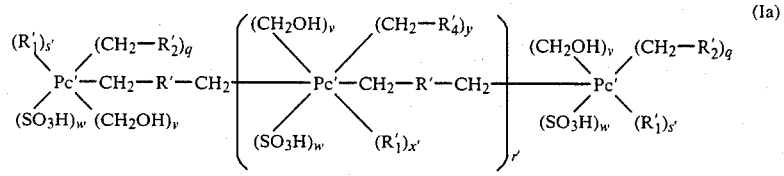

in which
Pc' is copper-, nickel-, iron-, cobalt-, zinc or aluminium-phthalocyanine;
R' is a group of the formula

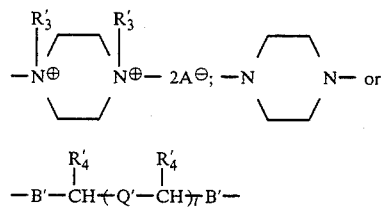

$R_1'$ is

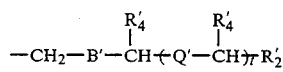

$R_2'$ is

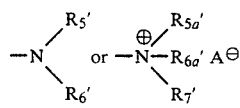

$R_3'$ is $(C_{1-4})$alkyl unsubstituted or substituted by one CN, OH or halogen group;

$R_4'$ is hydrogen or $C_{1-4}$alkyl unsubstituted or substituted by one CN, OH or halogen group;

$R_5'$ is selected from hydrogen; unsubstituted $C_{1-4}$alkyl; $C_{1-4}$alkyl substituted by one —COO($C_{1-4}$)alkyl, unsubstituted phenyl or —CONH$_2$ group; $C_{2-4}$-alkyl substituted by one chloro, bromo, CN and OH group; cyclohexyl unsubstituted or substituted by one unsubstituted $(C_{1-4})$alkyl or unsubstituted $(C_{1-4})$alkoxy group; and phenyl, unsubstituted or substituted by one $(C_{1-4})$alkyl or one $(C_{1-4})$alkoxy group, where the alkyl or alkoxy group may be substituted by one substituent selected from halogen, OH and CN;

$R_6'$ is selected from hydrogen, unsubstituted $C_{1-4}$alkyl, unsubstituted cyclohexyl, $(C_{2-4})$alkyl substituted by one chloro, bromo, OH or CN group and unsubstituted phenyl;

or $R_5'$ and $R_6'$ together with the N-atom to which they are attached form an unsubstituted morpholine, an unsubstituted piperidine, an unsubstituted pyrrolidine, an N-methyl piperazine or an unsubstituted piperazine and $R_{5a}'$ and $R_{6a}'$ independently, have the non-heterocyclic significances of $R_5'$ and $R_6'$ except for hydrogen; and $R_7'$ is unsubstituted $C_{1-4}$alkyl; or $R_{5a}'$, $R_{6a}'$ and $R_7'$ together with the $N^\ominus$ atom to which they are attached form a pyridinium ring, unsubstituted or substituted by a methyl group,

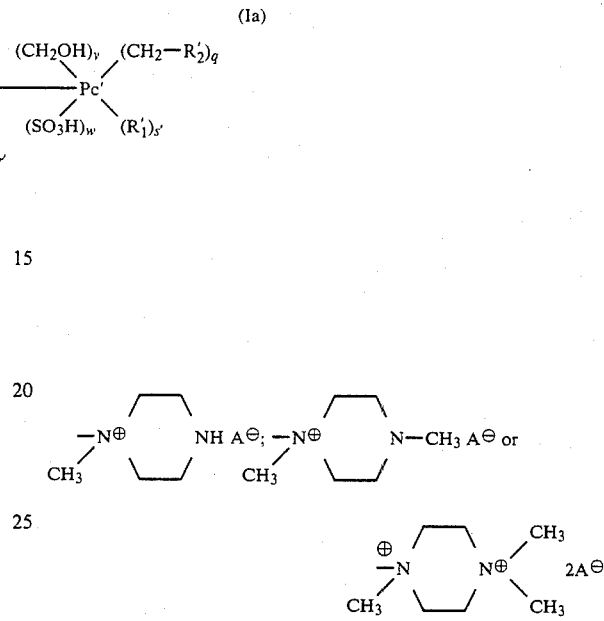

Q' is selected from a direct bond; —O—; —S—;

a branched or straight chain $(C_{1-10})$alkylene group which may be interrupted by one —O—, —S— or

group or which may be substituted by one CN, OH or halogen group; or a group of the formula

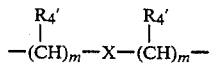

where
m is 0, 1, 2, 3, 4, 5 or 6;
$R_9$ is hydrogen, $C_{1-4}$alkyl unsubstituted or substituted by one OH, CN or halogen group; naphthyl unsubstituted or substituted by one $C_{1-4}$alkyl group or phenyl, unsubstituted or substituted by one $C_{1-4}$alkyl group, the alkyl of which may be substituted by one OH, CN or halogen group,
X is —NH—CO—NH; —NH—CO—(CH$_2$)$_m$—CO—NH—;

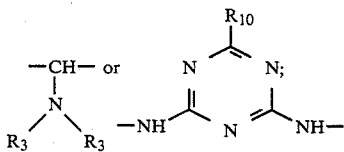

$R_{10}$ is OH, Cl or

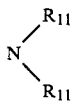

each $R_{11}$ independently is hydrogen, unsubstituted $C_{1-4}$alkyl or unsubstituted phenyl, B' is

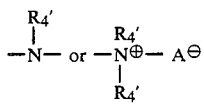

s' is a number not greater than 3
r' is a number from 0 to 6
x' is s' or s'−1
with the provisos that
(i) s'+q+v is a number from 1 to 3; and
(ii) s'+q=x'+y+1.

4. A phthalocyanine product according to claim 3 of formula (Ib)

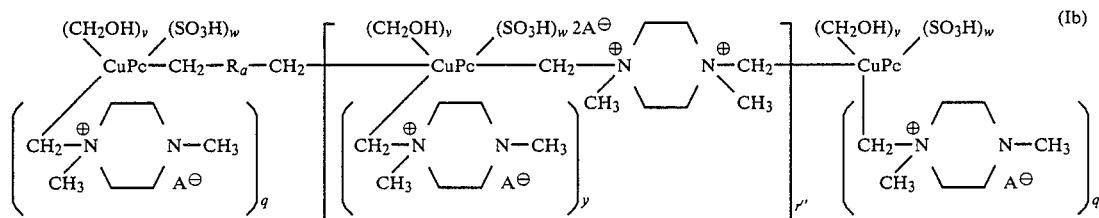

where $R_a$ is

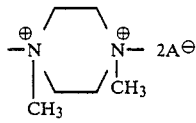

and r" is a number from 0 to 4, with the provisos that
(i) y+1=q and
(ii) q+v is a number from 1 to 3.

5. A phthalocyanine product according to claim 2 of the formula (Ic)

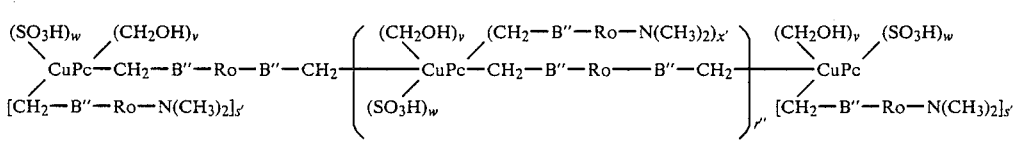

in which
Ro is —(CH$_2$)$_3$—, —(CH$_2$)$_4$—, —(CH$_2$)$_5$—, —(CH$_2$)$_6$—,

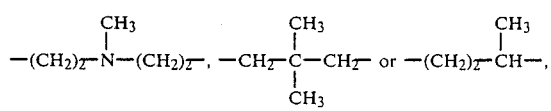

B" is —NH—, N(CH$_3$)— or

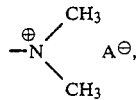

r" is a number from 0 to 4,
s' is a number not greater than 3
and x' is s' or s'−1
with the provisos that
(i) s'+v is a number from 1 to 3
and (ii) s'=x'+1.

6. A compound according to claim 2 wherein Q is Q' where Q' is selected from a direct bond; —O—; —S—;

a branched or straight chain (C$_{1-10}$)alkylene group which may be interrupted by one —O—, —S— or

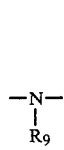

group or which may be substituted by one CN, OH or halogen group; or a group of the formula

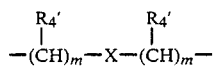

where
m is 0, 1, 2, 3, 4, 5 or 6;
$R_9$ is hydrogen, $C_{1-4}$alkyl unsubstituted or substituted by one OH, CN or halogen group; naphthyl unsubstituted or substituted by one $C_{1-4}$alkyl group or phenyl, unsubstituted or substituted by one $C_{1-4}$alkyl group, the alkyl of which may be substituted by one OH, CN or halogen group,
$R_4'$ is hydrogen or $C_{1-4}$alkyl unsubstituted or substituted by one —CN, —OH or halogen group;
X is —NH—CO—NH; —NH—CO—(CH$_2$)$_m$—CO—NH—;

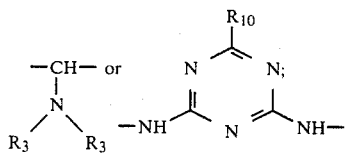

$R_{10}$ is OH, Cl or

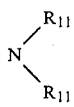

and each $R_{11}$ independently is hydrogen, unsubstituted $C_{1-4}$alkyl or unsubstituted phenyl.

7. A compound according to claim 2 wherein R is a group of one of the formulae (a) to (c).

8. A compound according to claim 1 wherein R is a group of one of the formulae (a) to (c).

9. A compound according to claim 6 wherein R is a group of one of the formulae (a) to (c).

10. A compound according to claim 7 wherein B is B″ where B″ is $-N^{\oplus}(CH_3)_2-A^{\ominus}$.

11. A compound according to claim 8 wherein B is B″ where B″ is $-N^{\oplus}(CH_3)_2-A^{\ominus}$.

12. A compound according to claim 9 where B is B″ where B″ is $-N^{\oplus}(CH_3)_2-A^{\ominus}$.

13. A compound according to claim 2 of the formula

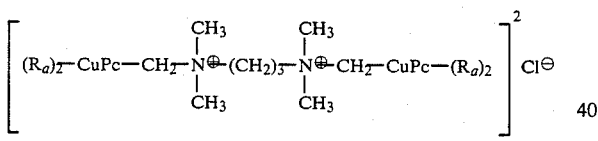
(1)

where each $R_a$ is

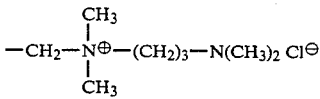

14. A mixture of compounds according to claim 2.
15. A mixture of compounds according to claim 6.
16. A mixture of compounds according to claim 12.
17. A mixture comprising a phthalocyanine product according to claim 2 and a phthalocyanine product of formula II

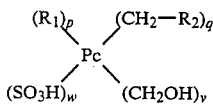
II in which

Pc, q, w, v, $R_1$ and $R_2$ are defined in claim 2
p is a number from 0 to 7;
with the provisos that
(i) p and q are not both zero
(ii) p+q+v is not greater than 7.

18. A mixture to claim 17 in which the phthalocyanine of formula II is of formula IIa

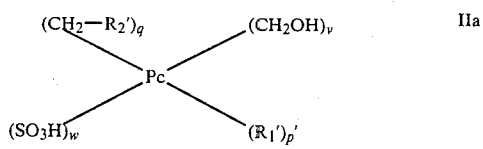
IIa in which

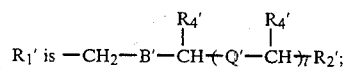

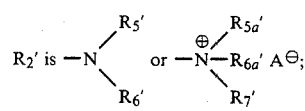

$R_4'$ is hydrogen or $C_{1-4}$ alkyl unsubstituted or substituted by one CN, OH or halogen group;

$R_5'$ is selected from hydrogen; unsubstituted $C_{1-4}$ alkyl; $C_{1-4}$ alkyl substituted by one $-COO(C_{1-4})$alkyl, unsubstituted phenyl or $-CONH_2$ group; $C_{2-4}$-alkyl substituted by one chloro, bromo, CN and OH group; cyclohexyl unsubstituted or substituted by one unsubstituted $(C_{1-4})$alkyl or unsubstituted $(C_{1-4})$alkoxy group; and phenyl, unsubstituted or substituted by one $(C_{1-4})$alkyl or one $(C_{1-4})$alkoxy group, where the alkyl or alkoxy group may be substituted by one substituent selected from halogen, OH and CN;

$R_6'$ is selected from hydrogen, unsubstituted $C_{1-4}$ alkyl, unsubstituted cyclohexyl, $(C_{2-4})$alkyl substituted by one chloro, bromo, OH or CN group and unsubstituted phenyl;

or $R_5'$ and $R_6'$ together with the N-atom to which they are attached form an unsubstituted morpholine, an unsubstituted piperidine, an unsubstituted pyrrolidine, an N-methyl piperazine or an unsubstituted piperazine; and $R_{5a}'$ and $R_{6a}'$ independently, have the non-heterocyclic significances of $R_5'$ and $R_6'$ except for hydrogen; and $R_7'$ is unsubstituted $C_{1-4}$ alkyl; or $R_{5a}'$, $R_{6a}'$ and $R_7'$ together with the $N^{\oplus}$ atom to which they are attached form a pyridinium ring, unsubstituted or substituted by a methyl group,

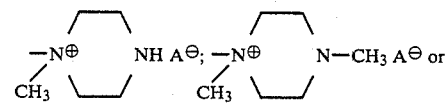

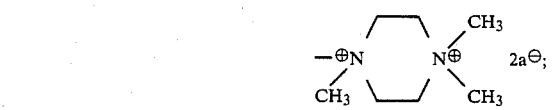

Q' is selected from a direct bond; $-O-$; $-S-$;

a branched or straight chain $(C_{1-10})$alkylene group which may be interrupted by one —O—, —S— or

group or which may be substituted by one CN, OH or halogen group; or a group of the formula

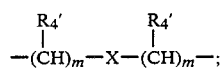

$R_9$ is hydrogen, $C_{1-4}$ alkyl unsubstituted or substituted by one OH, CN or halogen group; naphthyl unsubstituted or substituted by one $C_{1-4}$ alkyl group or phenyl, unsubstituted or substituted by one $C_{1-4}$ alkyl group, the alkyl of which may be substituted by one OH, CN or halogen group;

X is —NH—CO—NH; —NH—CO—$(CH_2)_m$—CO—NH—;

-continued

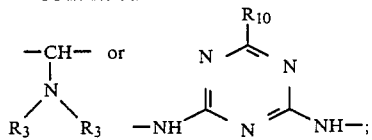

$R_3$ is $C_{1-10}$ alkyl, unsubstituted or substituted by one group selected from CN, OH, unsubstituted phenyl and halogen; or $C_{2-10}$ alkenyl, unsubstituted or substituted by one group selected from CN, OH, unsubstituted phenyl and halogen;

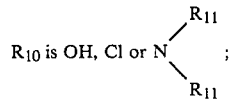

each $R_{11}$ independently is hydrogen, unsubstituted $C_{1-4}$ alkyl or unsubstituted phenyl;

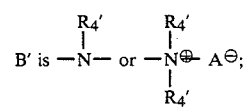

$A^\ominus$ is a non-chromophoric anion;
m is 0, 1, 2, 3, 4, 5 or 6;
p' is a number from 0 to 4;
q is a number from 0 to 6;
t is 0 or 1;
v is a number from 0 to 1;
and w is a number from 0 to 0.5; with the proviso that p'+q+v is a number from 2 to 4.

* * * * *

UNITED STATES PATENT AND TRADEMARK OFFICE
CERTIFICATE OF CORRECTION

PATENT NO. : 4,499,018

DATED : Feb. 12, 1985

INVENTOR(S) : Jacky Doré; Helmut Moser

It is certified that error appears in the above-identified patent and that said Letters Patent is hereby corrected as shown below:

Column 4, lines 1-4; in the formula "A'" should be -- Q' -- .

Column 5, line 9; "A" should be -- Q -- .

Column 6; in the portion of formula (Ia) which is inside the brackets "$(CH_2-R'_4)_y$" should be -- $(CH_2-R'_2)_y$ -- .

Column 33; in claim 3 in the portion of formula (Ia) inside the brackets "$(CH_2-R'_4)_y$" should be -- $(CH_2-R'_2)_y$ -- .

Signed and Sealed this

Twentieth Day of August 1985

[SEAL]

Attest:

DONALD J. QUIGG

Attesting Officer

Acting Commissioner of Patents and Trademarks